United States Patent
Shreedharan et al.

(10) Patent No.: US 11,662,882 B2
(45) Date of Patent: May 30, 2023

(54) USER-INTERFACE DRIVEN CREATION AND DISTRIBUTION OF COMPUTER APPLICATIONS

(71) Applicant: StreamSets, Inc., San Mateo, CA (US)

(72) Inventors: Hari Shreedharan, San Jose, CA (US); Arvind Prabhakar, Sunnyvale, CA (US)

(73) Assignee: StreamSets, Inc., San Mateo, CA (US)

( * ) Notice: Subject to any disclaimer, the term of this patent is extended or adjusted under 35 U.S.C. 154(b) by 0 days.

(21) Appl. No.: 16/855,898

(22) Filed: Apr. 22, 2020

(65) Prior Publication Data

US 2021/0333952 A1   Oct. 28, 2021

(51) Int. Cl.
| | |
|---|---|
| *G06F 3/048* | (2013.01) |
| *G06F 3/0482* | (2013.01) |
| *G06F 11/32* | (2006.01) |
| *G06F 9/38* | (2018.01) |
| *G06F 11/30* | (2006.01) |
| *G06F 11/34* | (2006.01) |

(52) U.S. Cl.
CPC .......... *G06F 3/0482* (2013.01); *G06F 9/3867* (2013.01); *G06F 11/3051* (2013.01); *G06F 11/32* (2013.01); *G06F 11/3409* (2013.01)

(58) Field of Classification Search
CPC .... G06F 3/0482; G06F 11/32; G06F 11/3409; G06F 9/3867; G06F 11/3051; G06F 8/34; G06F 11/302; G06F 11/3024; G06F 11/323; G06F 8/38
See application file for complete search history.

(56) References Cited

U.S. PATENT DOCUMENTS

2016/0034475 A1* 2/2016 Manoochehri ........ G06F 16/116
  707/756
2018/0052898 A1* 2/2018 Allan ...................... G06F 8/433

OTHER PUBLICATIONS

StreamSets (https://www.youtube.com/watch?v=NJ16REiow0A), attached as pdf, Apr. 7, 2019 (Year: 2019).*

* cited by examiner

*Primary Examiner* — Aleksey Olshannikov
(74) *Attorney, Agent, or Firm* — Schwegman Lundberg & Woessner, P.A.

(57) ABSTRACT

Systems and methods herein describe accessing a data processing pipeline, causing presentation of the data processing pipeline on a graphical user interface of a computing device; receiving a selection of a first user interface element within the graphical user interface, generating a datafile representing the data processing pipeline, submitting the datafile and an application to a software framework using an application programming interface, receiving, from the application, the generated datasets, applying the data operations the data processing pipeline, collecting performance data metrics from the data processing pipeline, and dynamically updating the graphical user interface with the collected performance data metrics.

18 Claims, 5 Drawing Sheets

USER-INTERFACE DRIVEN CREATION AND DISTRIBUTION OF COMPUTER APPLICATIONS

TECHNICAL FIELD

Embodiments of the present disclosure generally relate to computer application development. More particularly, but not by way of limitation, the present disclosure addresses systems and methods for user-interface driven creation and distribution of computer applications.

BACKGROUND

Building applications require writing complex code in specified programming languages. Such applications require low-level coding, which can be error-prone.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
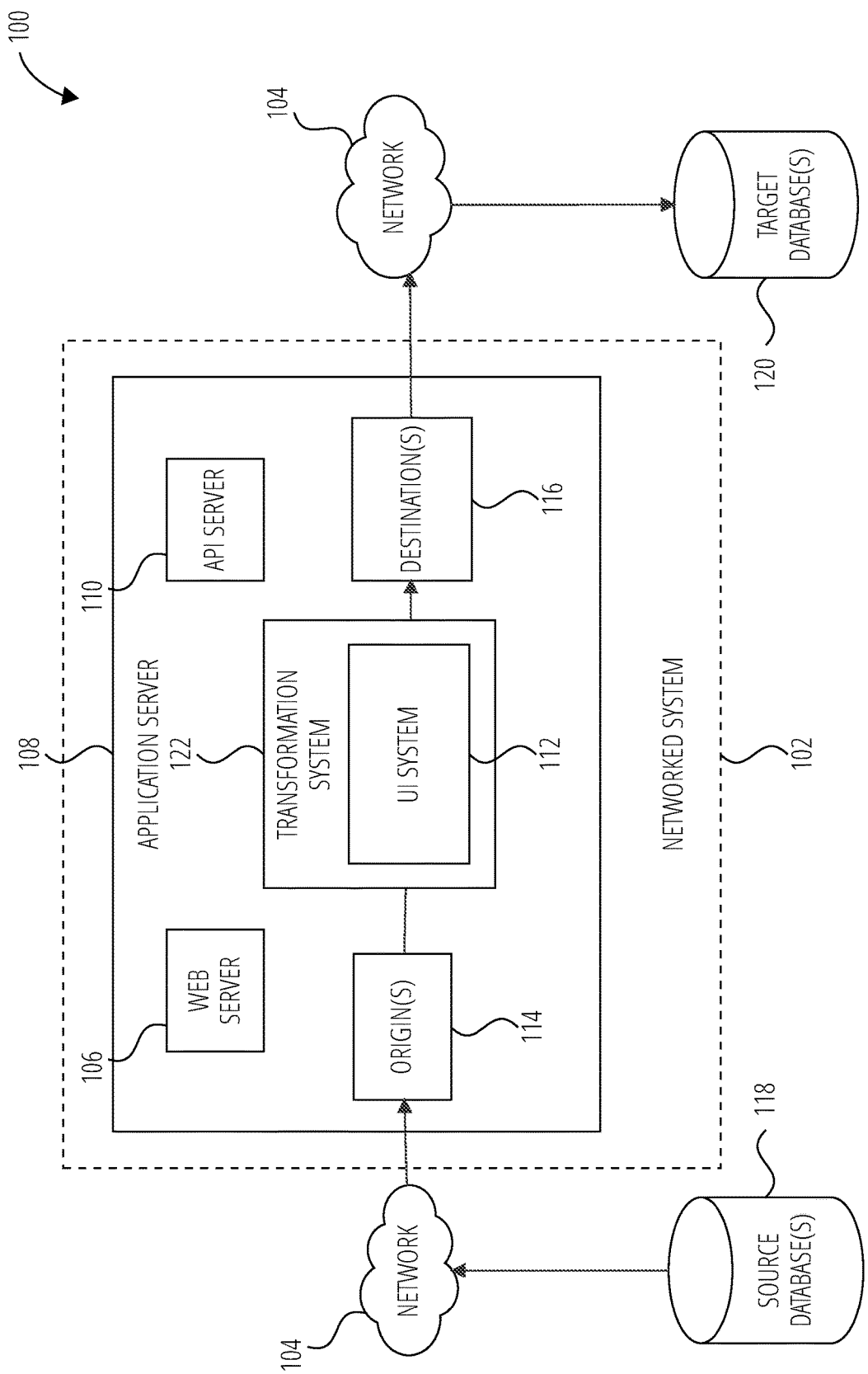
FIG. 1 is a network diagram depicting a network environment within which a progressive error handling system may be deployed, according to some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Developing robust applications (e.g., APACHE SPARK application) in such a way that the application can restart from where it left off requires complex programming and development, and is in most cases, unusable. Example embodiments are directed to improving application creation and distribution on a cluster computing framework.

In example embodiments, a data processing pipeline describes a flow of data from origin systems to destination systems and defines how to transform the data along the way. An origin is a data connecter (e.g., computer software) that can be used to access data from a data source. A destination, in contrast, writes data to a specified location. Each data processing pipeline may comprise two or more distinct points, also referred to as stages. Each data processing pipeline has an origin stage. The data in the data processing pipeline can be processed in multiple ways before it reaches the destination(s). As such, there are multiple processor stages to transform the data and resultant data can be written to multiple locations (e.g., destination stages).

In some embodiments, a transformation system is configured to run data processing pipelines on a cluster-computing framework. The data processing pipeline can perform transformations that require heavy processing on the entire data set. The transformation execution engine may be installed on a machine that is configured to submit computation tasks to a cluster (e.g., a group of inter-connected computers that work together to perform computationally intensive tasks). A user may utilize a web browser to access a control interface which may be used to design and run the data processing pipeline. The transformation execution engine submits the data processing pipeline as a task to the cluster.

Accordingly, in some embodiments, a user-interface system accesses a data processing pipeline from a web-based platform. The web-based platform may be part of the transformation system. The data processing pipeline comprises a series of data operations related to a set of data. For example, the data operations may include receiving the set of data from data sources, processing the set of data by applying data transformations on the set of data, and writing the processed set of data out to destinations. A user of a computing device can configure the data processing pipeline from the web-based platform. For example, a user can configure the data processing pipeline to read from specified data sources and can specify the various operations to be performed on the data before writing the processed data out to destinations.

Each operation may be referred to as a "stage." There are three types of stages. Origin stages are stages that read data from data sources (e.g., other data systems). Processor stages are stages that apply some form of processing (e.g., receives input data and produces output data). Example processing tasks include extract, transform, load (ETL) procedures, stream processing, and machine learning operations. Destination stages are stages that write data out into destinations.

The user-interface system receives a selection of a first user interface element within the graphical user interface. For example, a user of the computing device may select a button on the graphical user interface. In response to the selection, the user-interface system generates a datafile representing the data pipeline. In some embodiments, the user-interface system generates a JavaScript Object Notation (JSON) file. It is to be understood than any suitable file type may be generated.

The user-interface system submits the datafile and an application to a software framework using an application programming interface (API). The data processing pipeline may be represented as an application for execution on the software framework. For example, the application may be a bundled SPARK application. The software framework may be a cluster-computing framework (e.g., APACHE SPARK).

The software framework is configured to run the application using the datafile. For example, the bundled SPARK application reads the JSON file and creates internal memory representations of the configured stages. The configured stages are then visited using an algorithm (e.g., Depth-First Search Algorithm). A dataset representing the output of each stage is produced such that the output of stages that come first in the data processing pipeline is produced first and then passed as input to subsequent stages. The generated datasets describe the series of operations in the data processing pipeline.

Once all the datasets are produced, the user-interface system receives the datasets from the application via the API. The user-interface system applies the data operations described by the datasets to the set of data. The user-interface system collects performance data metrics from the data operations. For example, the performance data metrics may comprise detailed metrics on the performance of each of the data operations. In another example, the performance data metrics may include how long each operation takes and how much data is transferred at each stage (e.g., rate of input, rate of output). Performance data metrics may also include proactive and contextual error messages, if and when problems occur. Furthermore, the collected performance data metrics may comprise data metrics of the entire pipeline.

The user-interface system dynamically updates the graphical user interface on the web-based platform with the collected performance data metrics. A user is therefore able to analyze performance of their data processing pipeline without low-level programming.

A user is also able to leverage the user-interface system to update an existing application without having to reinvent the wheel. For example, an application (e.g., SPARK application) built using the user-interface system can be upgraded without losing existing data. This can be achieved by storing offset information in a permanent or persistent storage system (e.g., any computer data storage device that retains its data when the device is unpowered). For example, each time a batch of data is read, processed, and written, the transformation execution engine keeps track of the data that has been processed by storing an offset. The offset enables the transformation execution engine to keep track of the data that has been processed. The offset comprises information such as how to restart the pipeline from where each origin last left off. The information generally includes a start string, an end string, and a count. Each of the origin(s) is able to parse its own start and end strings to determine how to restart the data pipeline from where it left off. The origin is thus informed of a last batch of data that it sent, allowing the data pipeline to proceed from that point.

FIG. 1 is a diagram illustrating a network environment 100 suitable for user-interface driven creation and distribution of computer applications, in accordance with example embodiments. The network environment 100 includes a networked system 102 communicatively coupled via a network 104 to a database (e.g., source database(s) 118, target database(s) 120). In example embodiments, the networked system 102 comprises components that perform user-interface driven creation and distribution of computer applications. The components of the networked system 102 are described in more detail in connection with FIG. 2 and may be implemented in a computer system, as described below with respect to FIG. 5.

FIG. 1 illustrates, for example, a data pipeline with origin(s), and destination(s) 116, and a transformation system 122. The origin(s) 114 may be configured to couple to source database(s) 118 via the network 104. The transformation system 122 receives data from the origin(s) 114 and performs one or more transformation operations on the data. The transformation system 122 submits the transformed data to the destination(s) 116. In example embodiments, the transformation system 122 includes a user interface (UI) system 112. The UI system 112 is configured to provide a user-interface to aid creation and distribution of computer applications.

The networked system 102 provides server-side functionality via the network 104 (e.g., the Internet or Wide Area Network (WAN)) to one or more data storage systems. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

An Application Program Interface (API) server 110 and a web server 106 are coupled to, and provide programmatic and web interfaces respectively to, an application server 108. The application server 108 hosts the transformation system 122. The transformation system 122 facilitates data transformations and provides a user-interface for the creation and distribution of computer applications using the UI system 112. The application server 108 is, in turn, may be coupled to a database server (not shown) that facilitates access to source database(s) 118 and target database(s) 120.

While the transformation system 122 is shown in FIG. 1 to form part of the networked system 102, it will be appreciated that, in alternative embodiments, the transformation system 122 may form part of a service that is separate and distinct from the networked system 102. Similarly, while the UI system 112 is shown to form part of the networked system 102, it will be appreciated that, in alternative embodiments, the UI system 112 may form part of a service that is separate and distinct from the networked system 102.

Further, the network environment 100 is, of course, not limited to such an architecture as shown in FIG. 1 and could equally well find application in a distributed or peer-to-peer architecture system, for example. Any portion, or portions, of the transformation system 122 and the UI system 112 may reside and be executed from any kind of computing device. The transformation system 122 and the UI system 112 can also be implemented as standalone software program(s), which do not necessarily have networking capabilities.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 5, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
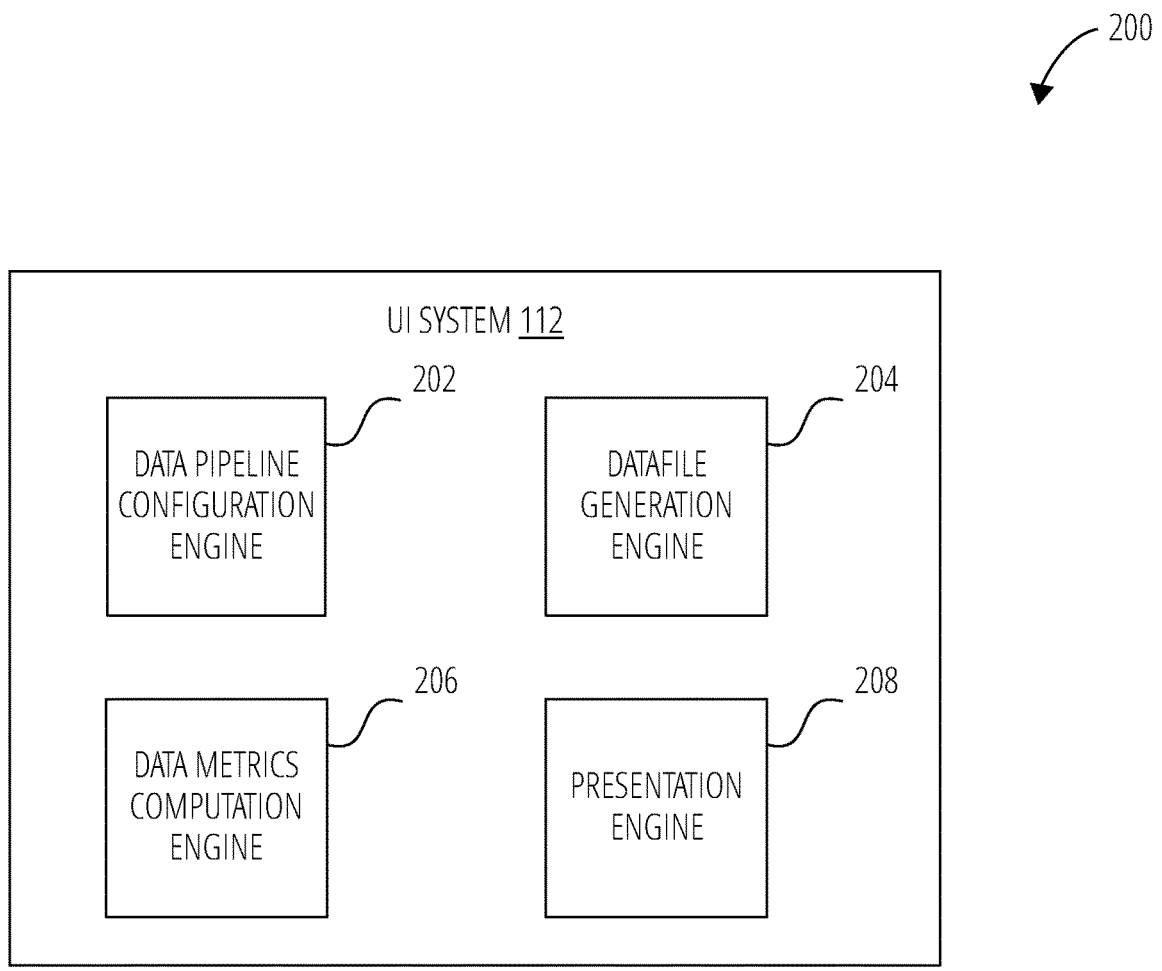
FIG. 2 is a block diagram showing components of user interface system, according to some example embodiments.

FIG. 2 is a block diagram 200 showing components of the UI system 112, according to some example embodiments. The UI system 112 is configured to facilitate user-interface driven creation and distribution of computer applications. To enable these operations, the UI system 112 comprises a data pipeline configuration engine 202, a datafile generation engine 204, a data metrics computation engine 206, and a presentation engine 208.

The data pipeline configuration engine 202 receives user input to create a data processing pipeline on a web-based platform. For example, the data pipeline configuration engine 202 receives the user input from the client device as a result of the user using an input device of the client device, such as by electing a button, tapping a user interface element, providing an audio input via a microphone, or the like. For example, the user may select user interface elements to represent different stages in a data processing pipeline.

The data processing pipeline may thus be displayed as user interface elements within a graphical user interface of the web-based platform. The user can configure the data sources (e.g., origin(s) 114) and destinations (e.g., destination(s) 116) to be used within the data processing pipeline.

The datafile generation engine 204 generates a datafile representing the created data processing pipeline. The datafile generation engine 204 may generate the datafile in response to receiving a selection of a first user interface element within the graphical user interface. In some embodiments, the datafile generation engine 204 may generate a first type of datafile in response to receiving a selection of a first user interface element. For example, the first type of datafile may represent the entire data processing pipeline. In some embodiments, the datafile generation engine 204 may generate a second type of datafile in response to receiving a selection of a second user interface element. The datafile generation engine 204 may determine which type of datafile to generate based on the received selection. For example, if the datafile generation engine 204 receives a selection of a button labeled "Run," the datafile generation engine 204 may generate the first type of datafile. If the datafile generation engine 204 receives a selection of a button labeled "Preview," the datafile generation engine 204 may generate the second type of datafile. For example, the second type of datafile may represent a portion of the data processing pipeline. In some embodiments, the datafile is a JSON file.

The data metrics computation engine 206 computes performance data metrics on the data processing pipeline. In some embodiments, the data metrics computation engine 206 computes the performance data metrics on the entire data processing pipeline. In some embodiments, the data metrics computation engine 206 computes the performance data metrics on individual operations within the data processing pipeline. For example, the performance data metrics may include how long each operation takes and how much data is transferred at each stage (e.g., rate of input, rate of output). Performance data metrics may also include proactive and contextual error messages if and when problems occur. The data metrics computation engine 206 may determine whether to compute data metrics on the entire data processing pipeline or on a portion of the data processing pipeline based on pre-defined user configurations.

The presentation engine 208 dynamically updates the graphical user interface within the web-based platform with the performance data metrics. For example, the presentation engine 208 may display graphs, charts, or any other visualizations of the performance data metrics. The presentation engine 208 may update the graphical user interface within the web-based platform in real-time or near real-time as the data is moving through the data processing pipeline.

Figure 3:
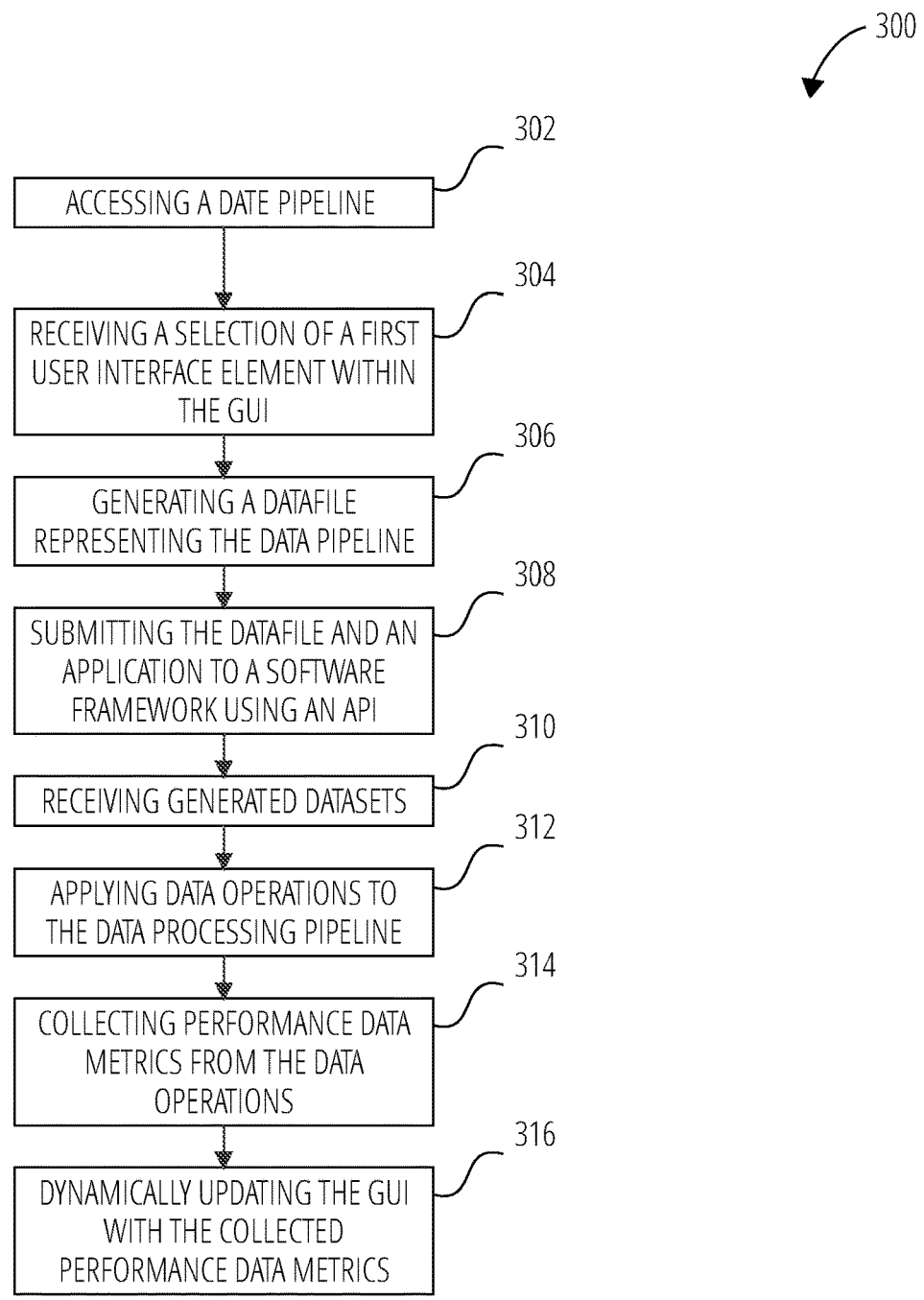
FIG. 3 is a flowchart of a method for user-interface driven creation and distribution of computer applications, according to some example embodiments.

FIG. 3 is a flowchart of an example method 300 for user-interface driven creation and distribution of computer applications, according to some example embodiments. Operations in the method 300 are performed by the networked system 102, using components described above with respect to FIG. 1 and FIG. 2 Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

At operation 302, the UI system 112 accesses a data processing pipeline from a web-based platform. The web-based platform may be part of the transformation system 122. The UI system 112 can be configured to cause display of the data processing pipeline on a graphical user interface of a computing device. In some embodiments, operation 302 is performed by the data pipeline configuration engine 202.

At operation 304, the UI system 112 receives a selection of a first user interface element within the graphical user interface. As used herein a user interface element may include but is not limited to input controls (e.g., checkboxes, radio buttons, dropdown lists, list boxes, buttons, toggles, text fields, date field). For example, the first user interface element may be a button configured to run the entire data processing pipeline At operation 306, in response to the selection, the UI system 112 generates a datafile representing the data processing pipeline. Operation 306 may be performed by the datafile generation engine 204. The data processing pipeline comprises a series of data operations. The generated data file represents the series of data operations within the data processing pipeline. Each operation may be referred to as a "stage." There are three types of stages. Origin stages are stages that read data from data sources (e.g., other data systems). Processor stages are stages that apply some form of processing (e.g., receives input data and produces output data). Example processing tasks include extract, transform, load (ETL) procedures, stream processing, and machine learning operations. Destination stages are stages that write data out into destinations. Each operation in the series of data operations is represented as a user interface element on the graphical user interface on the web-based platform.

At operation 308, the UI system 112 submits the datafile and an application to a software framework using an API. The UI system 112 generates the application using the data processing pipeline. For example, the application may be a SPARK application and the software framework may be a cluster-computing framework configured to run SPARK applications. The application reads the datafile and generates datasets. The datasets describe the series of data operations in the data processing pipeline. In some examples, the datasets are SPARK dataframes.

At operation 310, the UI system 112 receives the generated datasets (e.g., the datasets generated by the application at the cluster-computing framework) via the API and at operation 312, applies the data operations described by the datasets to the data processing pipeline. At operation 314, The UI system 112 collects performance data metrics from the data operations. For example, the performance data metrics may be collected by the data metrics computation engine 206. In some embodiments, the performance data metrics is collected on the entire pipeline. In some embodiments, the performance data metrics are collected on a portion of the data processing pipeline (e.g., only on some stages of the data processing pipeline). In other embodiments, the performance data metrics are collected on both the entire pipeline and on select portions of the pipeline. The performance data metrics may include a duration time for each operation in the series of operations and an amount of data transferred for each operation in the series of operations.

At operation 316, the UI system 112 dynamically updates the graphical user interface of the web-based platform with the collected performance data metrics. Operation 316 may be performed by the presentation engine 208.

In some embodiments, the UI system 112 receives a selection of a second user interface element. The second user interface element may be button configured to initiate a "preview" mode of the pipeline. In response to receiving the selection of the second user interface element, the UI system 112 performs a limited run of the pipeline. For example, in the "preview" mode, the UI system 112 may only display a limited number of results from each stage on the graphical user interface. For example embodiments, in response to receiving the selection of the second user interface element, the UI system 112 dynamically updates the graphical user interface on the web-based canvased with a collected subset of performance data metrics.

Figure 4:
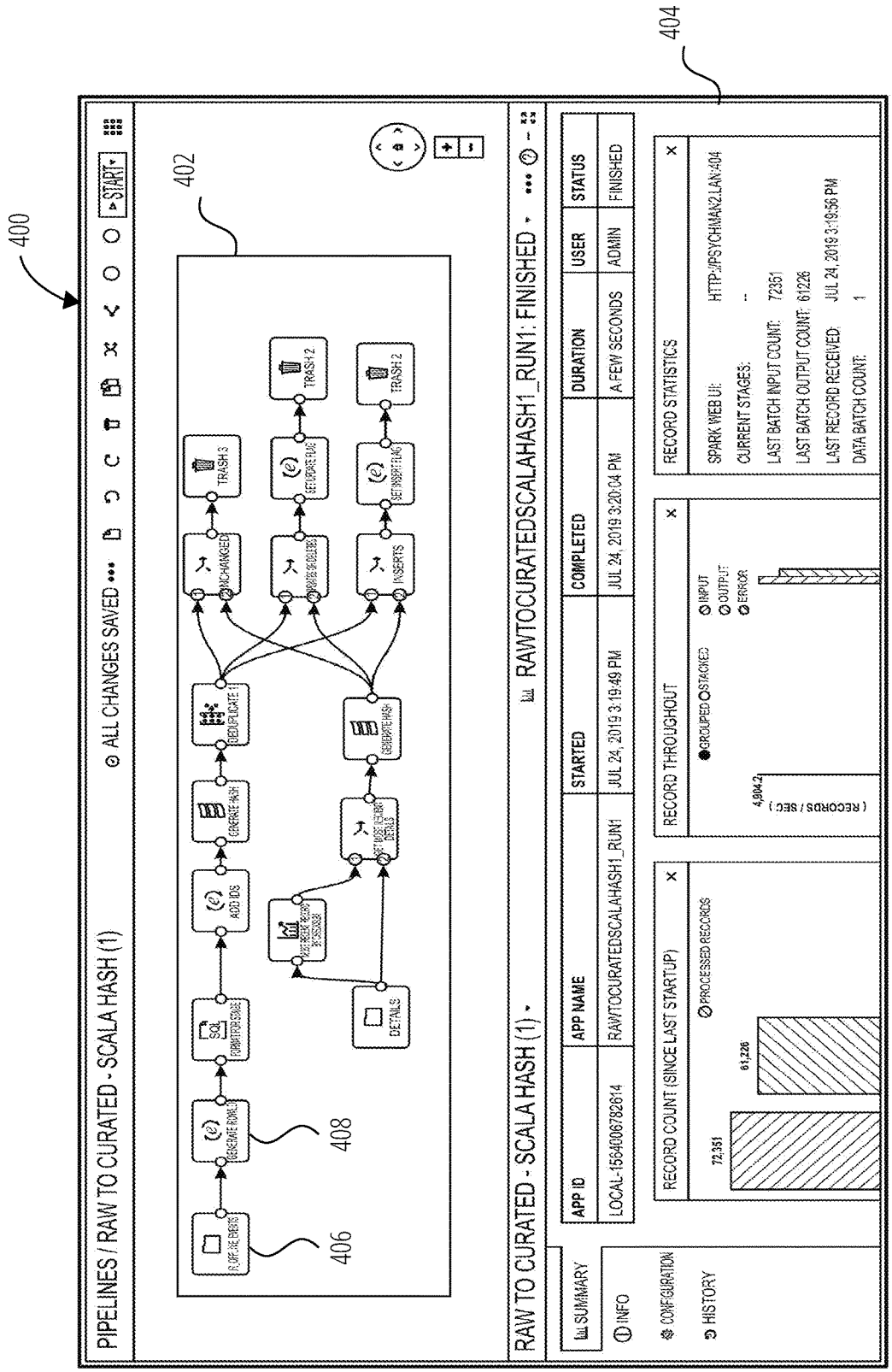
FIG. 4 is an illustration of a graphical user interface of a web-based platform according to some example embodiments.

FIG. 4 is an illustration of a graphical user interface 400 on a web-based platform, according to some example embodiments. The graphical user interface 400 may have a first portion displaying a data processing pipeline 402. After processing the data processing pipeline in "Run" or "Preview" mode, the graphical user interface 400 may be updated with a second portion displaying performance data metrics 404. Each stage in the data processing pipeline 402 may be represented by a user interface element (e.g., 406, 408).

Figure 5:
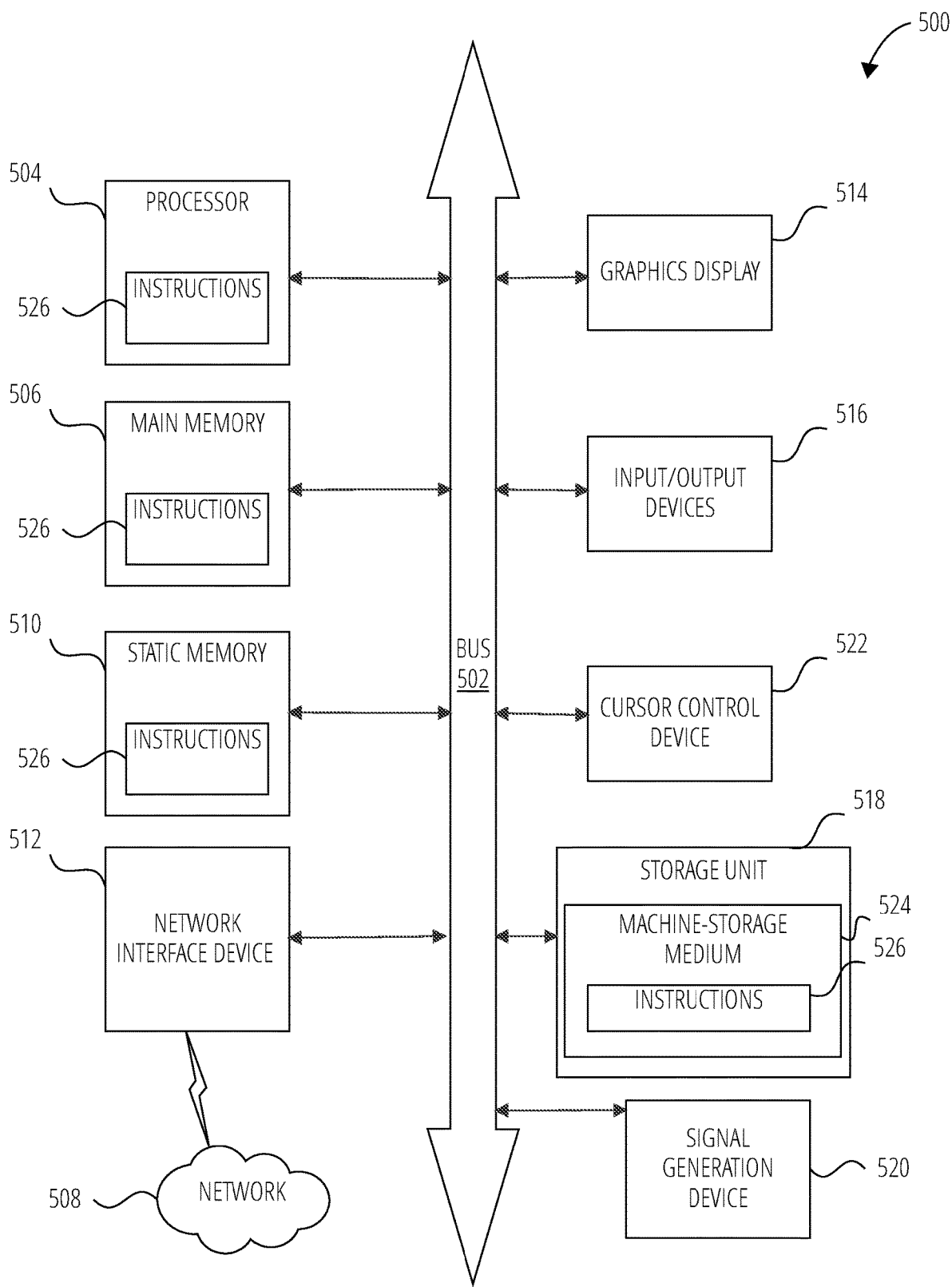
FIG. 5 shows a diagrammatic representation of a machine in the example form of a computer system within which a set of instructions, for causing the machine to perform any one or more of the methodologies discussed herein, may be executed, according to some example embodiments.

FIG. 5 illustrates components of a machine 500, according to some example embodiments, that is able to read instructions from a machine-storage medium (e.g., a machine-readable storage device, a non-transitory machine-readable storage medium, a computer-readable storage medium, or any suitable combination thereof) and perform any one or more of the methodologies discussed herein. Specifically, FIG. 5 shows a diagrammatic representation of the machine 500 in the example form of a computer device (e.g., a computer) and within which instructions 526 (e.g., software, a program, an application, an applet, an app, or other executable code) for causing the machine 500 to perform any one or more of the methodologies discussed herein may be executed, in whole or in part.

For example, the instructions 526 may cause the machine 500 to execute the flow diagrams of FIG. 3 In one embodiment, the instructions 526 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 526 (sequentially or otherwise) that specify actions to be taken by that machine. Further, while only a single machine is illustrated, the term "machine" shall also be taken to include a collection of machines that individually or jointly execute the instructions 526 to perform any one or more of the methodologies discussed herein.

The machine 500 includes a processor 504 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 506, and a static memory 510, which are configured to communicate with each other via a bus 502. The processor 504 may contain microcircuits that are configurable, temporarily or permanently, by some or all of the instructions 526 such that the processor 504 is configurable to perform any one or more of the methodologies described herein, in whole or in part. For example, a set of one or more microcircuits of the processor 504 may be configurable to execute one or more modules (e.g., software modules) described herein.

The machine 500 may further include a graphics display 514 (e.g., a plasma display panel (PDP), a light emitting diode (LED) display, a liquid crystal display (LCD), a projector, or a cathode ray tube (CRT), or any other display capable of displaying graphics or video). The machine 500 may also include an input/output device(s) 516 (e.g., a keyboard), a cursor control device 522 (e.g., a mouse, a touchpad, a trackball, a joystick, a motion sensor, or other pointing instrument), a storage unit 518, a signal generation device 520 (e.g., a sound card, an amplifier, a speaker, a headphone jack, or any suitable combination thereof), and a network interface device 512.

The storage unit 518 includes a machine-storage medium 524 (e.g., a tangible machine-readable storage medium) on which is stored the instructions 526 (e.g., software) embodying any one or more of the methodologies or functions described herein. The instructions 526 may also reside, completely or at least partially, within the main memory 506, within the processor 504 (e.g., within the processor's cache memory), or both, before or during execution thereof by the machine 500. Accordingly, the main memory 506 and the processor 504 may be considered as machine-readable media (e.g., tangible and non-transitory machine-readable media). The instructions 526 may be transmitted or received over a network 508 via the network interface device 512.

In some example embodiments, the machine 500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 506, 510, and/or memory of the processor 504) and/or storage unit 518 may store one or more sets of instructions and data structures (e.g., software) embodying or utilized by any one or more of the methodologies or functions described herein. These instructions, when executed by processor(s) 504 cause various operations to implement the disclosed embodiments.

As used herein, the terms "machine-storage medium," "device-storage medium," "computer-storage medium" (referred to collectively as "machine-storage medium 524") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 524 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 524 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 526 may further be transmitted or received over a communications network 726 using a transmission medium via the network interface device 512 and utilizing any one of a number of well-known transfer protocols (e.g., HTTP). Examples of communication networks 508 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 526 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
accessing, using one or more processors, a data processing pipeline;
causing presentation of the data processing pipeline on a graphical user interface of a computing device;
receiving a selection of a first user interface element within the graphical user interface;
in response to receiving the selection:
generating a first datafile representing the data processing pipeline, the first datafile comprising a first series of data operations of the data processing pipeline; and
generating an executable application associated with the first datafile using the data processing pipeline;
submitting the first datafile and the application to a software framework using an application programming interface (API), the application configured to read the first datafile and generate internal memory representations of the first datafile;
running, by the software framework, the application using the first datafile;
the running application generating first datasets that describes the first series of data operations of the data processing pipeline;
receiving, from the application via the API, the generated first datasets;
in response to receiving the generated first datasets, applying the data operations described by the first datasets to the data processing pipeline;
collecting first performance data metrics from the applying the data operations to the data processing pipeline;
dynamically updating the graphical user interface with the collected first performance data metrics;
receiving a second selection of a second user interface element within the graphical user interface;
in response to receiving the second selection, generating a second datafile representing a limited run of the data processing pipeline;
generating a second executable application associated with the second datafile;
submitting the second datafile and the second executable application to the software framework;
running the second executable application using the second datafile;
the running second executable application generating second datasets that describes a second series of data operations of the data processing pipeline, the second series of data operations comprising a subset of the first series of data operations;
receiving the second datasets;
in response to receiving the second datasets, applying the second series of data operations to the data processing pipeline;
collecting second performance data metrics; and
dynamically updating the graphical user interface with the second performance data metrics.

2. The method of claim 1, wherein the first series of data operations comprise:
receiving, a set of data from a data source;
processing the set of data by applying data transformations on the set of data; and
writing the processed set of data out to a destination.

3. The method of claim 2, wherein the destination is a target location for the set of data processed by the data processing pipeline.

4. The method of claim 2, wherein the software framework is a cluster-computing framework.

5. The method of claim 1, wherein each operation in the first series of data operations is represented as a user interface element on the graphical user interface.

6. The method of claim 1, wherein the accessed data processing pipeline is configurable by a user.

7. The method of claim 1, wherein the accessed data processing pipeline is displayed on the graphical user interface of the computing device.

8. The method of claim 1, wherein the first performance data metrics comprise:
a duration time for each operation in the first series of operations and an amount of data transferred for each operation in the first series of operations.

9. A computing apparatus, the computing apparatus comprising:
one or more processors; and
a memory storing instructions that, when executed by the one or more processors, cause the one or more processors to perform operations comprising:
accessing, using one or more processors, a data processing pipeline;
causing presentation of the data processing pipeline on a graphical user interface of a computing device;
receiving a selection of a first user interface element within the graphical user interface; in response to receiving the selection:
generating a first datafile representing the data processing pipeline, the first datafile comprising a first series of data operations of the data processing pipeline; and
generating an executable application associated with the first datafile using the data processing pipeline;
submitting the first datafile and the application to a software framework using an application programming interface (API), the application configured to read the first datafile and generate internal memory representations of the first datafile;
running, by the software framework, the application using the first datafile;
in response to running the application, generating, by the application, first datasets describing the first series of data operations of the data processing pipeline;
receiving, from the application via the API, the generated first datasets;
in response to receiving the generated first datasets, applying the data operations described by the first datasets to the data processing pipeline;
collecting first performance data metrics from the applying the data operations to the data processing pipeline;
dynamically updating the graphical user interface with the collected first performance data metrics
receiving a second selection of a second user interface element within the graphical user interface;
in response to receiving the second selection, generating a second datafile representing a limited run of the data processing pipeline;
generating a second executable application associated with the second datafile;
submitting the second datafile and the second executable application to the software framework;
running the second executable application using the second datafile;

in response to running the second executable application, generating second datasets describing a second series of data operations of the data processing pipeline, the second series of data operations comprising a subset of the first series of data operations;

receiving the second datasets;

in response to receiving the second datasets, applying the second series of data operations to the data processing pipeline;

collecting second performance data metrics; and dynamically updating the graphical user interface with the second performance data metrics.

10. The computing apparatus of claim 9, wherein the first series of data operations comprise:

receiving, a set of data from a data source;

processing the set of data by applying data transformations on the set of data; and writing the processed set of data out to a destination.

11. The computing apparatus of claim 10, wherein the destinations are target locations for the set of data processed by the data processing pipeline.

12. The computing apparatus of claim 10, wherein the software framework is a cluster-computing framework.

13. The computing apparatus of claim 9, wherein each operation in the first series operations is represented as a user interface element on the graphical user interface.

14. The computing apparatus of claim 9, wherein the accessed data processing pipeline is configurable by a user.

15. The computing apparatus of claim 9, wherein the accessed data processing pipeline is displayed on the graphical user interface of the computing device.

16. The computing apparatus of claim 9, wherein the first performance data metrics comprise:

a duration time for each operation in the first series of operations and an amount of data transferred for each operation in the first series of operations.

17. A non-transitory machine storage medium storing instructions that when executed by one or more processors of a machine, cause the machine to perform operations comprising:

accessing, using one or more processors, a data processing pipeline;

causing presentation of the data processing pipeline on a graphical user interface of a computing device;

receiving a selection of a first user interface element within the graphical user interface; in response to receiving the selection:

generating a first datafile representing the data processing pipeline, the first datafile comprising a first series of data operations of the data processing pipeline; and generating an executable application associated with the first datafile using the data processing pipeline;

submitting the first datafile and the application to a software framework using an application programming interface (API), the application configured to read the first datafile and generate internal memory representations of the first datafile;

running, by the software framework, the application using the first datafile;

in response to running the application, generating, by the application, first datasets describing the first series of data operations of the data processing pipeline;

receiving, from the application via the API, the generated first datasets;

in response to receiving the generated first datasets, applying the data operations described by the first datasets to the data processing pipeline;

collecting first performance data metrics from the applying the data operations to the data processing pipeline;

dynamically updating the graphical user interface with the collected first performance data metrics receiving a second selection of a second user interface element within the graphical user interface;

in response to receiving the second selection, generating a second datafile representing a limited run of the data processing pipeline;

generating a second executable application associated with the second datafile;

submitting the second datafile and the second executable application to the software framework;

running the second executable application using the second datafile;

in response to running the second executable application, generating second datasets describing a second series of data operations of the data processing pipeline, the second series of data operations comprising a subset of the first series of data operations;

receiving the second datasets;

in response to receiving the second datasets, applying the second series of data operations to the data processing pipeline;

collecting second performance data metrics; and dynamically updating the graphical user interface with the second performance data metrics.

18. The non-transitory machine storage medium of claim 17, wherein the first series of data operations comprise:

receiving, a set of data from a data source;

processing the set of data by applying data transformations on the set of data; and writing the processed set of data out to destinations.

* * * * *